May 26, 1970  R. L. SHALLENBERG  3,513,741
ELECTRONIC STOCK MEASUREMENT APPARATUS
Filed Nov. 20, 1967  4 Sheets-Sheet 1

Inventor:
Robert L. Shallenberg
By
Fair, Freeman & Molinare
Attys.

May 26, 1970  R. L. SHALLENBERG  3,513,741
ELECTRONIC STOCK MEASUREMENT APPARATUS
Filed Nov. 20, 1967  4 Sheets-Sheet 3

Inventor:
Robert L. Shallenberg
By Bair, Freeman & Molinare
Attys.

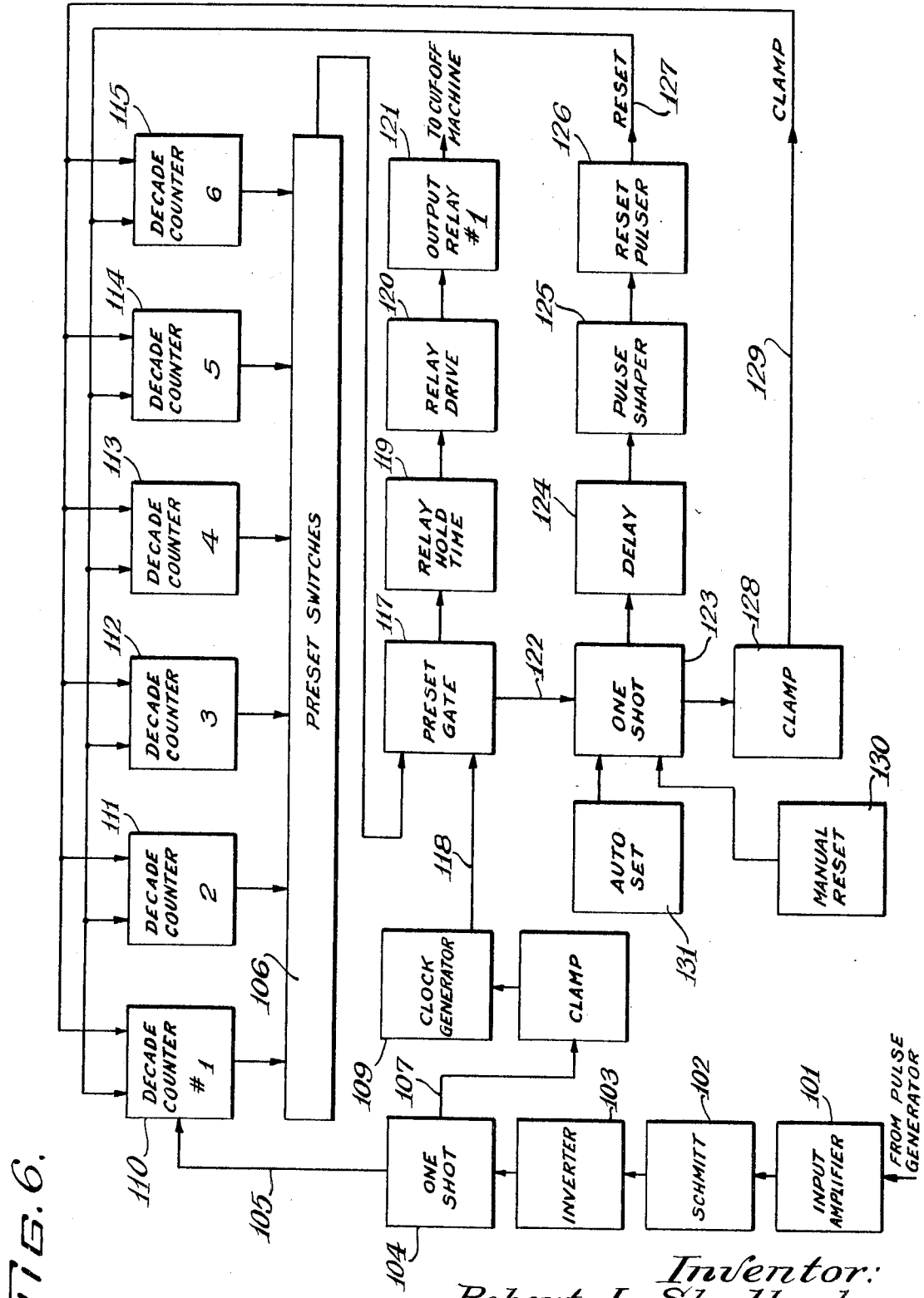

United States Patent Office 3,513,741
Patented May 26, 1970

3,513,741
ELECTRONIC STOCK MEASUREMENT APPARATUS
Robert L. Shallenberg, Wheaton, Ill., assignor to Servicemaster Industrial Systems Company, a corporation of Illinois
Filed Nov. 20, 1967, Ser. No. 684,405
Int. Cl. B26d 5/26
U.S. Cl. 83—278       3 Claims

ABSTRACT OF THE DISCLOSURE

Electronic measurement apparatus for controlling the operation of a cut-off machine for workpieces in the form of pipes, rods and the like such that the workpiece is automatically cut to a desired, preselected length as it is moved from a storage rack to a discharge conveyor. As the workpiece is pushed by a driven carriage member toward the cut-off machine, an electrical pulse generator mounted on the carriage member produces a predetermined number of electrical pulses corresponding to the amount of translational movement of the workpiece so as to provide an accurate measurement of such movement. These pulses are applied to a predetermined counter circuit which stores the pulse count and provides an output signal to initiate the cutting operation of the cut-off machine as soon as the pulse count reaches the prescribed value set into the counter. In this manner, the workpiece can automatically be cut into pieces of any desired length in accordance with the selective setting of the pulse counter.

OBJECTS OF THE INVENTION

It is one of the objects of the present invention to provide an electronic measurement apparatus for a stock cutting machine in which a workpiece is fed accurately to cutting position under the control of a predetermined counter circuit which is responsive to movement of the workpiece feeding means.

Another object is to provide an electronic measurement apparatus for a stock cutting machine in which the movement of the workpiece by a pusher device down a guideway toward the cut-off machine results in the generation of electrical pulses corresponding in number to the amount of such movement and the generated pulses are supplied to a predetermined electronic counter which initiates the operation of the cut-off machine to cut the workpiece to a selected length determined by the setting of the electronic counter.

According to another object of the invention, successive workpieces may automatically be cut to a predetermined length by combining the electrical pulse generator with a recycling predetermined electronic counter which is automatically reset for another predetermined count after each cutting operation.

The above and other objects and features of the invention will be more readily apparent from the following description when read in connection with the accompanying drawings, in which:

FIGS. 1 and 1A, taken together, are a side elevation of an automatic cutting machine having an electronic measurement cut-off control means embodying the invention;

FIG. 5 is a diagrammatic view of the electrical pulse generator; and

FIG. 6 is a block diagram of an illustrative predetermined counter circuit which may be used in the electronic stock measurement apparatus of the invention.

DESCRIPTION OF THE INVENTION

The electronic measurement stock cut-off control means of the present invention is particularly useful in connection with an automatic cutting machine of the type disclosed in my co-pending application entitled Automatic Cutting Machine, S.N. 683,937 filed Nov. 17, 1967. An understanding of the invention will be facilitated by an illustrative example which will be described in conjunction with the accompanying drawings.

The complete system of an illustrative cut-off machine and the electronic measurement control therefor comprises a storage rack for receiving and holding a number of elongated workpieces, such as pipes, rods, structural shapes or the like, which are removed singly from the storage rack and transferred to a guiding frame along which they are fed to a cutting means by a pusher. When the leading end of a workpiece is a predetermined distance from the cutting means, its position is sensed and the electronic measurement controller is signaled to advance the workpiece a further predetermined distance sufficient just to bring its leading end beyond the cutting means. At this time the controller stops the feeding of the workpiece and causes the cutting means to operate to cut off the leading end of the workpiece smoothly and squarely. After the initial cut, the controller causes the feeding means to advance the workpiece a distance equal to the desired length of a cut piece plus blade width and again causes the feeding means to stop and the cutting means to operate to cut off the workpiece. This operation continues under the control of the electronic measurement controller until the workpiece has been cut into the maximum number of cut pieces which its length will accommodate.

As the pieces are cut from the workpiece they are moved from the cutting position onto a discharge conveyor by a discharge device. The cut pieces are guided on the conveyor until they reach a desired discharge point at which time they are pushed laterally from the conveyor and are guided into a bin, a vat or the like. Short ends left on the workpieces after the desired pieces are cut therefrom, are carried by the same conveyor and are directed into a different collecting area by a movable gate.

The storage rack and transfer mechanism

Figure 1:
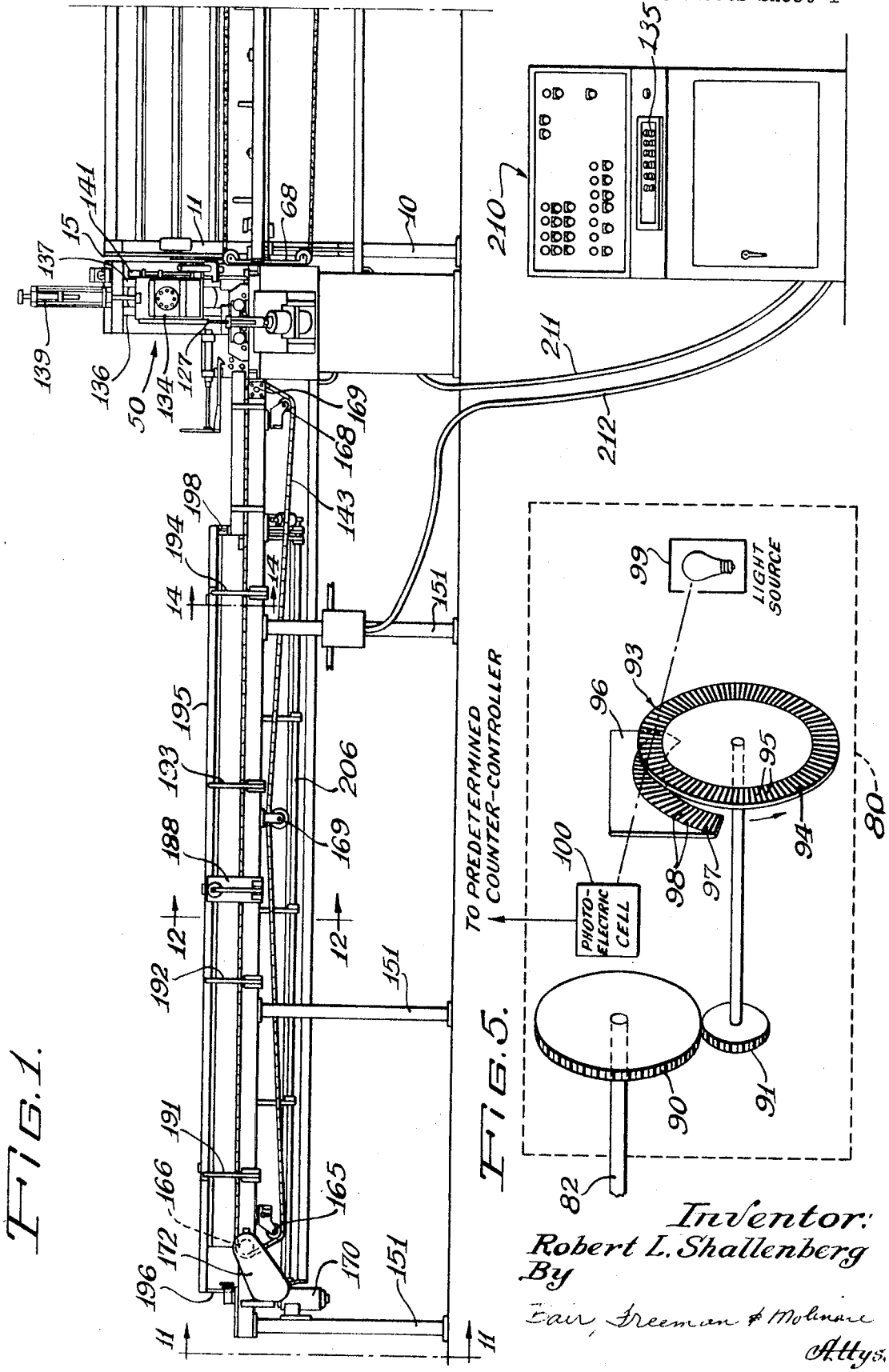
Figure 2:
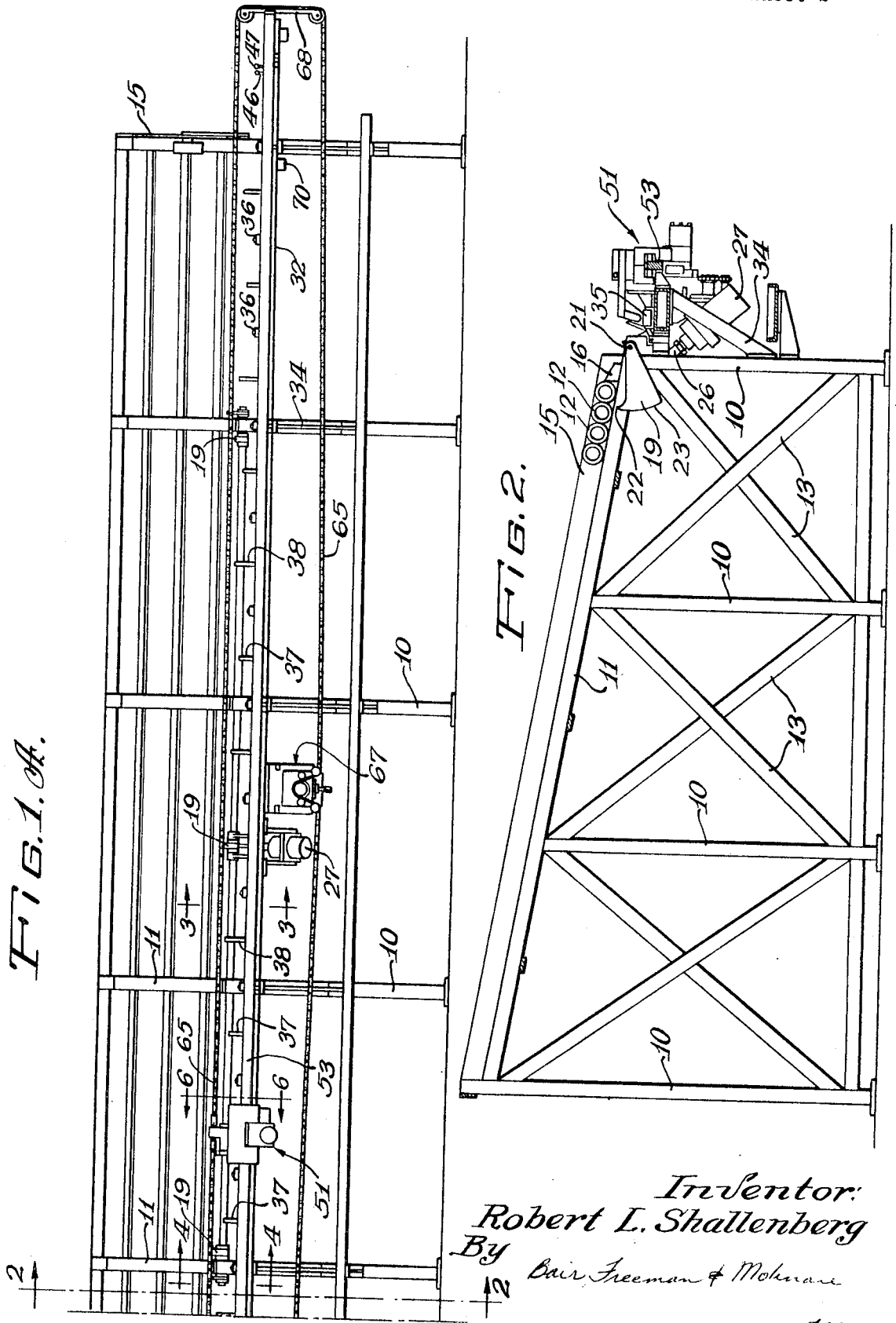
FIG. 2 is a section on the line 2—2 of FIG. 1A.

The storage rack for holding the workpieces and the transfer mechanism for removing workpieces therefrom are best shown in FIG. 1, 1A and 2. As there shown, the storage rack comprises a series of upright posts 10 of different lengths which are connected at their tops by downwardly sloping rails 11, on which elongated workpieces, such as the pipes 12 are adapted to rest. The posts 10 may be connected by cross braces 13, and the ends of the rack may be provided with upwardly extending guard rails 15 to locate the workpieces longitudinally on the rack and to prevent them from sliding accidentally off of the ends of the rack. The rack may be made of any desired size to hold any requisite number of workpieces which will tend to roll or slide toward the lower ends of the rails 11, as seen in FIG. 2, where they may be discharged singly from the rack.

For discharging the workpieces a transfer mechanism is provided adjacent to the lower end of the rack. While the details of this transfer mechanism are fully disclosed in the above-identified co-pending application, it is sufficient for purposes of the disclosure to state that the leading or lower-most workpiece 12 on the rails 11 is transferred from the storage rack by a series of transfer bars 19. The bars 19, as shown in FIGS. 1, 1A and 2, are secured to and spaced lengthwise of a shaft 21 for simultaneous movement. Each bar 19 is provided with an upper pointed hook portion 22 and with an arcuate end 23. The hook portions 22 on the bars 19 will engage just behind the leading workpiece and so that the arcuate surface 23 will engage the next workpiece on the rack as the bars 19 are raised to prevent the workpieces from moving down the rack.

When the bars 19 are raised to their uppermost position where they allow the leading workpiece to roll down the bars and from the storage rack to a supporting and guiding frame, to be described hereinafter. In order to turn the bars the shaft 21 is connected to the piston rod 26 of a hydraulic pick cylinder 27. Energization of the hydraulic pick cylinder 27 causes its piston rod 26 to extend and rock the transfer bars 19 upwardly to transfer the leading workpiece 12 to the rollers 35 on the frame. The transfer bars are returned by the hydraulic cylinder to the position shown in FIG. 2, at which time the workpieces from the rack will move forward until the lowermost workpiece engages the stop finger 16. The workpieces will remain in this position until it is desired to transfer another workpiece from the storage rack.

The supporting frame and guides

Workpieces transferred from the storage rack are received in an elongated supporting frame extending along the lower edge of the storage rack from the outer end thereof to the cutting means. As shown in FIGS. 1, 1A, 2, and 3, the supporting frame comprises an elongated box beam 32 which may be secured to the forward posts of the storage rack by brackets 33. Angle braces 34, as best seen in FIGS. 1A ad 2, may also be provided to assist in supporting the beam 32. On its upper surface the beam 32 carries a series of horizontal rollers 35 which are rotatably supported in U-shaped brackets 36 and upon which a workpiece is adapted to rest for free movement lengthwise of the frame. In order to guide a workpiece accurately during its movement along the frame, fixed guide members 37 and movable guide members 38 are provided. The guide members preferably are adjusted as fully explained in the above-identified co-pending application to hold a workpiece, such as a pipe or rod as shown in dotted lines in FIG. 3, on the supporting frame.

Stock pusher and electronic measurement apparatus assembly

Figure 3:
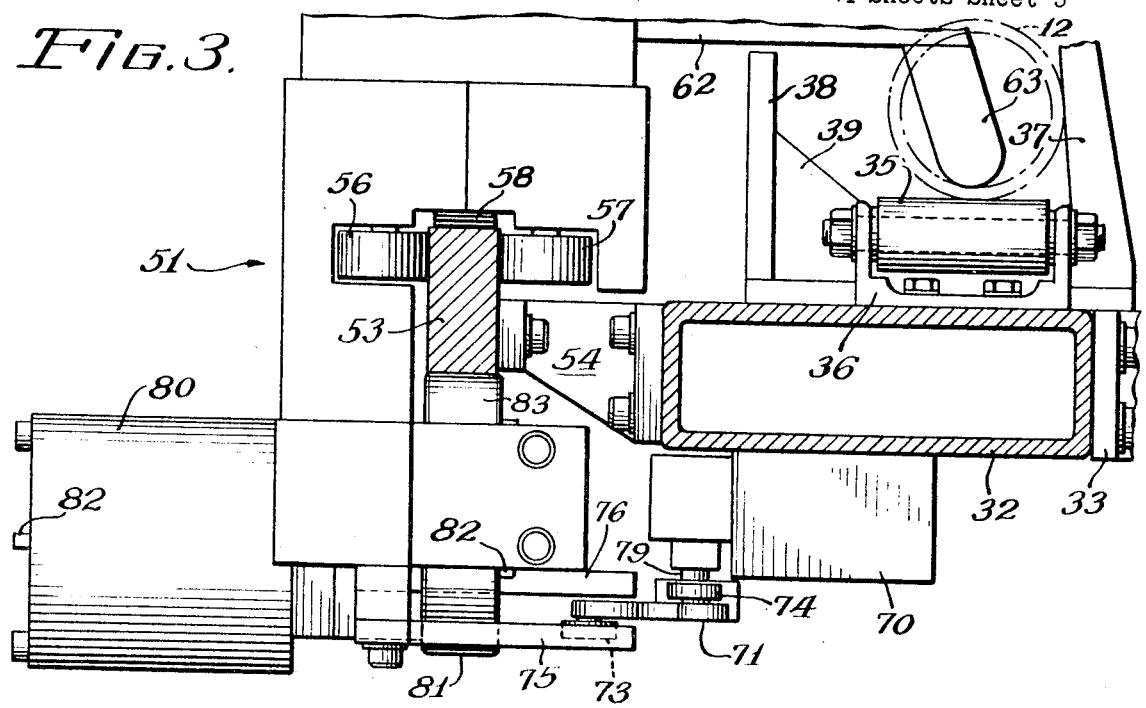
FIG. 3 is a partial section on the line 3—3 of FIG. 1A.

After a workpiece has been transferred from the storage rack to a position atop the rollers 35, it is moved axially toward the cutter assembly indicated generally at 50 in FIG. 1 by means of a pusher indicated generally at 51 in FIGS. 1A, 2 and 3. The pusher 51 is mounted for rolling, translational movement on a horizontal running rail 53 which is mounted parallel with and spaced from the box beam 32 by a series of brackets 54.

Figure 4:
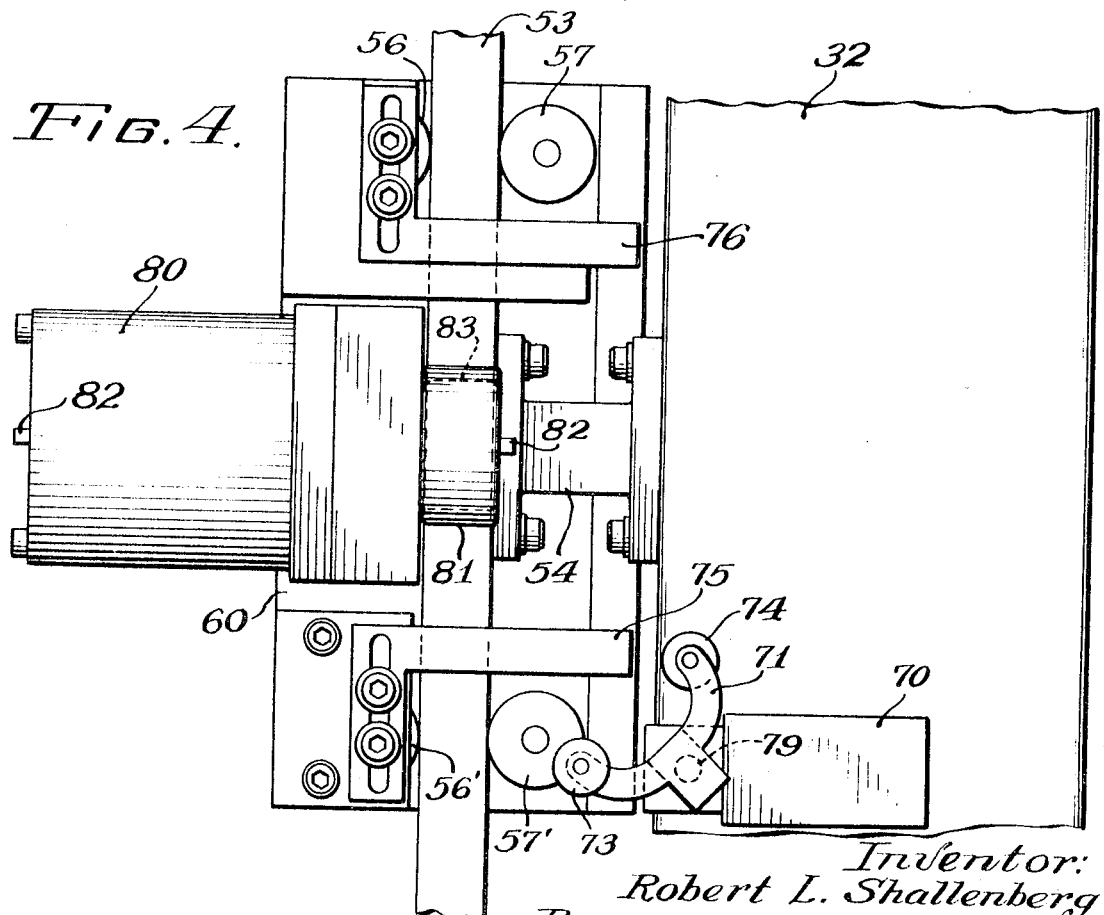
FIG. 4 is a bottom view of the pusher mechanism illustrated in FIG. 3.

The pusher is supported by two sets of three rollers each. Rollers 56, 57 and 58 are clearly seen in FIG. 3. Roller 58 provides vertical support for one end of the pusher and bears against the top surface of running rail 53. Rollers 56 and 57 bear against the opposite sidewalls of the running rail 53. The positions of rollers 56 and 57 (as well as their counterparts 56' ad 57') are also shown in FIG. 4, a bottom view of the mechanism depicted in FIG. 3. The axles upon which these rollers rotate are rigidly affixed to the carriage section 60 of pusher 51. A pusher arm 62 is rigidly affixed to the top of carriage 60 and includes a downwardly extending member 63 which engages with the end of the workpiece resting on the rollers 35, as illustrated in FIG. 3.

As seen in FIGS. 1 and 1A, the pusher 51 is coupled to and driven by a chain loop 65. Motive power for the chain loop 65 is supplied by a variable speed drive motor indicated generally at 67 in FIG. 1A. As the chain loop 65 is driven in a counterclockwise direction as seen in FIG. 1A, the pusher 51 travels down the running rail 53, pushing the workpiece before it toward the cutter 50. By reversing drive motor 67, the pusher is pulled by chain loop 65 from left to right away from cutter 50. The chain 65 is held in a generally rectangular loop by means of sprockets positioned at the end of spreader arm 68 (seen in FIG. 1) and 69 (seen in FIG. 1A). Spreader arms 68 and 69 are mounted at the ends of box beam 32.

As seen in FIG. 1A, a limit switch 70 is mounted on the underside of the box beam 32 at the end of the storage rack farthest from the cutter assembly 50. Switch 70 functions to prevent a workpiece from being transferred from the storage rack unless pusher 51 is positioned to the right of switch 70 as shown in FIG. 1A. Switch 70 opens as pusher 51 moves past it from left to right and is closed as the pusher 51 passes from right to left.

Referring to FIGS. 3 and 4, the switch 70 is mounted on the underside of box beam 32 and includes a U-shaped actuating arm 71. Rollers 73 and 74 are positioned at the ends of U-shaped arm 71, the roller 73 being mounted on the underside of arm 71 while the roller 74 is mounted above arm 71. A pair of L-shaped plates 75 and 76, mounted in vertically spaced relation with respect to one another, engage with the rollers 73 and 74 respectively. With the U-shaped actuating arm positioned as shown in FIGS. 3 and 4, roller 73 is positioned to engage with the inwardly extending arm of L-shaped plate 75 as the pusher 71 passes switch 70. When this occurs, the U-shaped actuating arm 71, and shaft 79 upon which it is mounted, pivot to operate the switch. Roller 74 then moves into alignment with the path of the inwardly extending finger portion of L-shaped member 76, such that, when the pusher 51 again passes the switch 70 in the opposite direction, the U-shaped actuating arm will be returned to the position shown in FIGS. 3 and 4.

An electrical pulse generator mounted within a cylindrical casing 80 is fitted to the carriage section 60. This pulse generator produces a predetermined number of electrical impulses for each unit of translational motion of the carriage 60 with respect to the running rail 53. A driven roller 81 is mounted at the extended end of a shaft 82 journaled in the casing 80. A drive roller 83 engages with the driven roller 81 and with the underside of the running rail 53 so that, as the carriage 60 moves down the rail 53, driving roller 83 rotates the driven roller 81 and the shaft 82. Rotation of the shaft 82 produces electrical impulses (typically, 1000 pulses for each inch of movement of the carriage 60). By monitoring these impulses, it is possible to accurately measure the movement of pusher 51 and hence the movement of the workpiece over the rollers 35. The manner in which these impulses are produced and utilized will be discussed in more detail below.

In accordance with a feature of this invention the electrical pulse generator mounted within the cylindrical casing 80 may take the form illustrated diagrammatically in FIG. 5 of the drawing. Such a pulse generator is available commercially, as for example, the high speed rotary pulse generator marketed by Veeder-Root, Incorporated, of Danvers, Mass., as its Series 182100. As thereshown the shaft 82 extending into the casing 80 rotates a driving gear 90 which, in turn, rotates a driven gear 91 coupled through the shaft 92 to the rotatable disc 93. Advantageously, the disc 93 may be formed of a transparent plastic material and the peripheral portion 94 of the disc has a plurality of opaque lines 95 uniformly spaced therearound. In one embodiment of the invention, the transparent plastic disc 93 was 3 inches in diameter and the peripheral line bearing portion 94 thereof was 3/8 inch wide. Each opaque line 95 was 1/32 of an inch wide and the transparent spaces between adjacent lines also was made 1/32 of an inch wide.

As shown in FIG. 5, a masking member 96 is positioned in juxtaposition with the disc 93. Preferably, the masking member 96 also is formed of transparent plastic material and an edge portion 97 thereof also is provided with alternate opaque lines 98 and transparent spaces, each 1/32 of an inch wide, in the same manner as the peripheral portion 94 of the disc 93. The line bearing edge portion 97 of the masking member 96 is aligned with the peripheral portion 94 of the disc 93 such that rotation of disc 93 with respect to the fixed masking member 96 serves as a light shutter in blocking the transmission of light therethrough when the opaque lines 95 of disc 93 are aligned with the transparent spaces of masking member 96 and in permitting light transmission therethrough when the opaque lines 95 of disc 93 are aligned with the opaque lines 98 of the masking member 96.

As shown in FIG. 5, a light source 99 is provided on one side of the disc and masking member, and a photoelectric cell 100 is positioned on the other side thereof. Those skilled in the art will appreciate that the rotation of the disc 93 in response to the movement of the workpiece 12 and pusher 51 down the frame towards the cut-off machine 50 will result in the generation of a plurality of electrical pulses at the output of the photoelectric cell 100. In one embodiment of the invention, 1000 electrical pulses are generated for each revolution of the plastic disc 93 which corresponds to 1 inch of translational movement of the workpiece towards the cut-off machine. By supplying the generated electric pulses to a predetermined counter-controller, such as that illustrated in FIG. 6, the cut-off machine can be controlled to operate and cut-off a portion of the workpiece at any desired length as determined by the selective setting of the predetermined counter switches 135, shown in FIG. 1.

The construction and operation of the illustrative predetermined counter-controller will now be described with reference to FIG. 6 of the drawing. Although the predetermined counter-controller may comprise any one of the several such circuits available on the market, advantageously it may take the form of the unit marketed by Veeder-Root, Incorporated, of Danvers, Mass., under the trademark "Digi-Master." In that unit, the generated electrical pulses from the photoelectric cell 100 of the pulse generator are applied to an input amplifier 101, the amplified output of which is applied to a pulse shaping circuit 102. Advantageously the pulse shaping circuit 102 may comprise a well known type of Schmitt circuit which serves to square the amplified input pulses and limit them to a uniform amplitude. The output of the Schmitt pulse shaping circuit 102 is applied to an amplifier-inverter 103 which passes the pulses into a one-shot multi-vibrator 104 so as to provide the pulses with a uniform width.

The leading edge of the shaped pulses at the output of the one-shot multi-vibrator 104 is applied by the lead 105 to the input of a plurality of sequentially connected decade counters 110 through 115 inclusive. As is well known in the art, each decade counter is adapted to recycle after receiving and counting 10 input pulses, and an output pulse to the next succeeding decade counter is provided at the end of each cycle. Thus each decade counter takes the form of a ring counter in which the driving pulses cause the counter to step sequentially from "0" to "9" and back to "0" again. Each time a decade counter goes from "9" to "0," an output pulse is generated which transfers a count into the next higher decade counter.

A row of preset switches 106 is associated with the decade counters 110 through 115 and in accordance with well known techniques each of the switches 106 may be set selectively to any number from "0" to "9" such that the predetermined counter may be set to provide an output control signal upon the receipt of any number of input pulses from 1 to 999,999 in the illustrative embodiment shown in FIG. 6. Obviously, the capacity of the present counter may be increased or decreased by respectively increasing or decreasing the number of decade counter units.

When the total number of electrical pulses generated by the pulse generator equals the preset number selectively set in the switches 106, an output pulse is applied by the lead 116 to the input of the present gate 117. It will be noted that the one-shot multi-vibrator 104 is connected to a clamp circuit 108 by the lead 107. In the operation of the circuit, the trailing edge of the output pulse from the one-shot multi-vibrator 104 is delayed by the width of the pulse and is fed to the clamp circuit 108 which converts it into a short spike before passing it into a current amplifier 109 from which it is issued as a clock pulse.

The clock pulses from the clock generator 109 are applied by the lead 118 to the preset gate 117, and if an output pulse from the preset switches 106 is present on lead 116 indicating that the preset count has been reached, the gate 117 will be actuated by the next occurring clock pulse from clock generator 109. The output of gate 117 actuates a relay hold time circuit 119 and relay drive circuit 120 to operate an output relay 121. The relay hold time circuit 119 controls the duration of hold-in of output relay 121. The operation of output relay 121 signals the cut-off machine 50 to begin the cut-off operation on the workpiece at the preselected length.

At the time the gate 117 is opened to initiate the cut-off operation, a pulse also is applied from the gate to a one-shot multi-vibrator 123 which, in turn, passes a pulse to the clamp circuit 128. The latter generates a pulse which is impressed by the lead 129 on all of the decade counters 110 through 115 to cause them to stop counting. The one-shot multi-vibrator 123 also sends a pulse through the delay circuit 124 and the pulse shaper 125. The output from the pulse shaper 125 is passed to a current amplifier reset pulser 126 which drives a pulse over the lead 127 into each decade counter to cause them to be reset to zero. In addition, the predetermined counter-controller is provided with a manual reset 130 which is connected to the one-shot multi-vibrator 123 to initiate the same reset sequence upon the actuation of a manual button. Also, a special auto-set circuit is connected to the one-shot multi-vibrator 123 to provide an initial reset when the counter is first turned on so that it is immediately ready for use.

The cutting assembly

FIG. 1 illustrates the cutting assembly 50 which is adapted to be controlled by the above-described circuitry. After a desired length of the workpiece has been measured by the electronic measurement assembly and the workpiece is locked into the cutting position, in the manner described in detail in my co-pending application, the saw blade 127 is automatically lowered to cut through the workpiece. After the workpiece has been cut, the saw blade 127 is automatically raised to its original position to enable the workpiece to be moved down the frame guideway for another measuring and cutting operation.

The saw blade and motor drive of the cutting assembly 50 may be any of a number of types known in the art and adapted for use with the present invention. The cutting assembly generally shown at 50 is comprised of a power blade drive motor in a mounting carriage housing 134. The housing 134 is freely movable in a vertical plane along the guide bars 136 and 137. The cutter assembly 50 is raised and lowered by the hydraulically actuated cutter cylinder 139. When the saw blade 127 begins rotation, the cutter cylinder 139 is actuated to lower the cutter assembly 50 to cut the workpiece. After the workpiece is cut, the cutter assembly 50 is raised by the cutter cylinder 139 until a projection on the housing 134 trips a limit switch 141 and turns off the saw blade motor.

The discharge mechanism, conveyor and push off assembly

After the workpiece has been cut, and the saw blade 127 raised from the slot defined by the cut between the sections of workpiece, the newly cut portion of the workpiece 90 is positioned on a conveyor generally shown at 143 and distributed to a bin or any suitable receptacle.

The conveyor assembly, onto which the newly cut workpiece is supported by upright members 151, as illustrated in FIG. 1, for example. The conveyor 143 forms a closed loop which is guided by the adjustable sprocketed wheels 165 through 168 and the non-sprocketed wheel 169. The sprocketed wheel 166 also acts as the drive wheel, being driven by a drive belt and the electric motor 170, which is mounted on the upright members 151 positioned at the end of the conveyor assembly. The drive belt is protected by a metal shroud 172.

Since a detailed description of the constructions and operation of the discharge mechanism, conveyor and push off assembly has been given in my cop-pending application identified above, and since such details do not form a part of the invention disclosed and claimed herein, such details need not be repeated.

What is claimed is:

1. Electronic measurement apparatus for controlling the operation of a cutting machine so as to cut a workpiece into preselected lengths comprising,
   a carriage member for propelling the workpiece along a supporting frame towards a cutting machine, an electrical pulse generator having roller means mounted to said carriage member for rotation against said frame as said carriage member propels the workpiece along the supporting frame for generating electrical pulses corresponding in number to the amount of translational movement of the workpiece,
   predetermined counter means capable of having a predetermined count selectively set therein and of producing an output signal when the number of pulses applied thereto equals said predetermined count,
   means for connecting said pulse generator to said predetermined counter means such that the number of pulses applied thereto equals said predetermined count when the preselected length of the workpiece is moved past said cutting machine by the carriage means,
   and means for applying said output signal to said cutting machine to initiate a cutting operation to cut the preselected length from the workpiece when the electrical pulses applied to the predetermined counter equals the predetermined count set therein.

2. Electronic measurement apparatus in accordance with claim 1 in which said electrical pulse generator also includes a source of radiant energy,
   interrupted means positioned in the path of said radiant energy and coupled to said roller means for rotation therewith so as to interrupt the radiant energy in a manner related to the movement of the workpiece along the supporting frame, and
   radiant energy sensitive means positioned to receive the interrupted radiant energy and to produce a number of electrical pulses representative of the amount of the movement of the workpiece.

3. Electronic measurement apparatus for controlling the operation of a cutting machine so as to cut a workpiece into preselected lengths comprising
   a carriage member for propelling the workpiece along a supporting frame towards a cutting machine,
   an electrical pulse generator coupled to said carriage member and responsive to its movement for generating electrical pulses corresponding in number to the amount of translational movement of the workpiece,
   predetermined counter means capable of having a predetermined count selectively set therein and of producing an output signal when the number of pulses applied thereto equals said predetermined count,
   reset circuiting means for resetting the counter to its starting position when said predetermined count is reached and said output signal is produced so as to place in the apparatus in condition for another workpiece measurement and cutting operation,
   means for connecting said pulse generator to said predetermined counter means such that the number of pulses applied thereto equals said predetermined count when the preselected length of workpiece is moved past said cutting machine by the carriage means,
   and means for applying said output signal to said cutting machine to initiate a cutting operation to cut the preselected length from the workpiece when the electrical pulses applied to the predetermined counter equals the predetermined count set therein.

References Cited

UNITED STATES PATENTS

| | | | |
|---|---|---|---|
| 2,491,901 | 12/1949 | Moohl et al. | 83—222 |
| 3,215,015 | 11/1965 | Neely | 83—363 |
| 3,251,255 | 5/1966 | Bauman | 83—369 X |

ANDREW R. JUHASZ, Primary Examiner

J. F. COAN, Assistant Examiner

U.S. Cl. X.R.

83—210, 365, 369; 318—18